Patented Aug. 10, 1948

2,446,990

UNITED STATES PATENT OFFICE 2,446,990

WATER-SETTING CEMENT COMPOSITION

Clyde C. Schuetz, Mount Prospect, Ill., assignor to United States Gypsum Company, Chicago, Ill., a corporation of Illinois No Drawing. Application November 29, 1943, Serial No. 512,249

5 Claims. (Cl. 106—99)

The present invention relates to a water-setting cement composition comprising substantial quantities each of finely ground water-granulated blast furnace slag, fly ash, and Portland cement; particularly when said composition is employed to form sheet products containing substantial quantities of inorganic fibers, as for example, asbestos fibers.

The invention relates moreover to a process for the production of molded materials comprising the set reaction products of finely ground water-granulated blast furnace slag, Portland cement, and fly ash, either with or without admixture with an inorganic fibrous material such as asbestos fibers. The invention also comprises a method of activating ground water-granulated blast furnace slag as a cementing agent by the reaction therewith of fly ash and a minor proportion of Portland cement in the presence of water.

The manufacture of cementitious material from slag has been practiced for many years, but in general cements made from blast furnace slag have not found a great deal of favor particularly as they do not keep very well. For instance, it has been suggested to mix blast furnace slag with lime, and also small quantities of sodium hydroxide or sodium sulfate, so as to obtain a mixture having hydraulic properties. Such mixtures, however, have not been particularly popular, primarily because of the general failure on the part of the manufacturers thereof to understand the necessity that the slag employed must be of the water quenched variety, and that no really useful product can be obtained from the merely air-cooled so-called bank slag; and moreover that even cements made from proper slag deteriorate rather rapidly in storage as compared with Portland cement, which latter has good keeping qualities.

As is well known, formed products and molded products, particularly in the form of sheets such as are used for partitions, sidings and shingles, have long been made from a mixture of asbestos fibers and cement, generally known as fiber cement or asbestos cement, having been worked up by two well known methods, one of these being the so-called "wet" or "Hatschek" process, and the other a dry process, often named after its inventor, the "Norton" process. The wet, or Hatschek process comprises making a mixture of asbestos, say from 15% to 20% with from 85% to 80% of Portland cement, beating this mixture, as for instance in a paper beater, until the cement and the fibers have absorbed considerable water, and then building up a laminated sheet from the mixture by picking it up on felts, transferring it to an accumulator roll, and eventually cutting the laminated cylinder thus obtained, flattening it out, pressing it, and permitting the cement to set. This so-called Hatschek process has been very widely applied in all parts of the world for the making of sidings, shingles and other building elements.

In the Norton process there is prepared a dry mixture in substantially the same proportions as in the Hatschek process. This dry mixture is spread out into a sheet having about two or three times the thickness of the article which is to be made, whereafter the mixture is compacted dry by means of rollers, and is then sprayed with enough water to wet it so thoroughly that the setting of the cementitious ingredient can take place. Sometimes there is also additional compression after the wetting operation, but in any event, the setting ingredient in all of these asbestos cement products has been Portland cement.

The constantly growing demand for products of this type, and the increasing competition between the different products on the market, has led to a search for a more economical binding material than the conventionally used Portland cement. Of course, it was not desired to sacrifice either strength or durability in the product. The substitution of other cementitious materials has been beset by all kinds of difficulties, but particularly by the fact that many of the bonding materials proposed do not permit of filtration of the material with sufficient rapidity to permit the manufacture of the product on the wet machine by the Hatschek process, or if they can be made that way, require such a slowing up of the felt speed as to render the process uneconomical. Furthermore, the bonding agent, in order to lend itself to the operations of the Hatschek process, must be free of strongly alkaline chemicals by reason of the fact that the wool felts used in the process are readily destroyed by the solvent action of alkalies.

In accordance with the present invention it has been found that the Portland cement in such asbestos-cement mixture can be replaced almost entirely by a setting material consisting of a mixture of finely ground water-granulated blast furnace slag, and the material known as fly ash. The latter is the fine ash or flue dust carried by the combustion products of pulverized coal plants. Thus, where pulverized coal is used as a fuel, the rush of gases and the force of propulsion of the finely divided coal particles causes the coal to burn with a long white flame, and by reason of the speed of the combustion gases these will carry forward with them into the flues, stacks, and settling chambers, the incombustible ingredients of the coal, which settles out in these flues and chambers in a very finely powdered form, being known to the art as fly ash. It appears that by reason of its extremely fine subdivision, the fly ash undergoes a certain amount of decomposition in the presence of water, and will in some manner react with the blast furnace slag, and a minor proportion of Portland cement, to yield a mixture which is capable of setting hydraulically.

The effect of the fly ash and a minor proportion of Portland cement therefore is in some respects similar to the effect of lime and sodium hydroxide on the ground slag, except that the mixture will never react strongly alkaline, as it would if sodium hydroxide were used. Inasmuch as lime, in admixture with ground blast furnace slag, forms a very slow filtering mixture, such a bonding agent is not suitable for the manufacture, for example, of asbestos cement sheets even in the absence of sodium hydroxide. However, by employing a mixture of ground water-granulated blast furnace slag and fly ash, together with a small amount of Portland cement, it was found that asbestos cement products could be made by the wet process on the regular machines with substantially no changes in the operational details of the process.

Attempts have been made to use blast furnace slag as a cement, with sodium hydroxide as a catalyzer, but inasmuch as in the wet or Hatschek process a closed system is used through which all the excess water circulates, it is self-evident that there will be a build up of soluble alkali which is intolerable because of its effect on the felts, and hence requires that the system must be frequently drained for cleaning. Moreover, if too great a quantity of soluble salts is left in the product, as would be the case if sodium sulfate were used as a catalyzer, this will eventually effloresce and form a most undesirable bloom on the material.

Based upon the above consideration, and in accordance with the present invention, the cementitious or setting portions of the mixture (calculated on the fiber-free basis) may consist substantially of the following: Portland cement, not substantially below 15%, and not substantially more than 85% of a mixture of water-granulated blast furnace slag, and fly ash, which fly ash, however, should not be substantially less than 1/10 of the quantity of the slag employed, nor more than about 1/5 of the cementitious mixture. The amount of Portland cement in the mixture can of course be increased, and products may be made (which however are those of the prior art) in which the Portland cement would replace all of the slag and fly ash. However, there is little advantage to be gained from the use of less than about 10% of slag in the mixture. In other words, the mixture of fly ash and slag is a substitute for a portion of the Portland cement which has previously been used for making asbestos cement products, and this substitution is the quintessence of the present invention.

In general, the limitations or range of ingredients so far as the cementitious or setting ingredient is concerned, may be as follows:

|  | Percent |
|---|---|
| Portland cement | 15 to 89 |
| Finely ground blast furnace slag (87% through a 325 mesh sieve) | 10 to 75 |
| Fly ash | 1 to 20 |

Within the range above shown, there may be made up a mixture for the manufacture of asbestos cement products having about the following formula:

|  | Percent |
|---|---|
| Asbestos fiber | 15 |
| Water granulated blast furnace slag* | 64 |
| Portland cement | 13 |
| Fly ash | 8 |

*Dried and ground to a fineness of 87% through a 325 mesh sieve.

A mixture such as the above may be suspended in sufficient water to form a slurry which is then placed in the pick-up tanks of the Hatschek machine from which a plurality of layers are picked up, there being a succession of such pick-up tanks containing the pick-up cylinders, over which the felt successively passes, thus picking up successive thin layers of the wet mixture, thus building up a laminated sheet which is eventually collected on a collecting roller, from which it is stripped, flattened out, and then pressed, and permitted to set. It is not believed necessary in this specification to recite all of the details of the making of the cement sheets, as these have been so fully described in the Hatschek patents and improvements thereon as to be familiar to every one in this art.

Alternatively, the mixture thus described may be formed dry into a compacted mass, in accordance with the Norton process, and then sufficiently wetted to cause the material to set.

It is of course obvious that the invention is not circumscribed by the details given above, but that the mixture of fly ash, finely ground water-granulated blast furnace slag, and Portland cement, may be used in admixture with suitable aggregates, be they fibrous or otherwise, for the formation of the molded cementitious articles.

Moreover the exact formula given is purely exemplificative, and any proportion of mixtures within the broad ranges hereinabove stated is to be considered within the scope of the hereunto appended claims, in which the invention as claimed comprises:

1. A water-setting cementitious mixture consisting of 15% of asbestos fiber, 64% of water-granulated blast furnace slag, dried and ground to a fineness of 87% through a 325 mesh sieve, 13% of Portland cement, and 8% of fly ash.

2. A fiber-cement article resulting from the setting of the composition as claimed in claim 1.

3. A water setting cement composition comprising from about 15% to 89% of Portland cement, from about 10% to 75% of water-granulated blast furnace slag ground to a fineness such that at least about 87% thereof will pass through a 325 mesh screen, and from about 1% to 20% of fly ash.

4. A fiber-cement article comprising a fibrous aggregate bonded by a set cement composition as claimed in claim 3.

5. A fiber-cement article as claimed in claim 4, in which the fibrous aggregate is asbestos.

CLYDE C. SCHUETZ.

REFERENCES CITED

The following references are of record in the file of this patent:

UNITED STATES PATENTS

| Number | Name | Date |
|---|---|---|
| 747,919 | Passow | Dec. 22, 1903 |
| 769,078 | Hatschek | Aug. 30, 1904 |
| 2,246,537 | Rembert | June 24, 1941 |
| 2,250,107 | Nelles | July 22, 1941 |
| 2,295,155 | Brown | Sept. 8, 1942 |

FOREIGN PATENTS

| Number | Country | Date |
|---|---|---|
| 367,815 | Great Britain | 1932 |
| 513,903 | Great Britain | 1939 |